United States Patent [19]

Godec

[11] Patent Number: 5,087,355
[45] Date of Patent: Feb. 11, 1992

[54] AUTOMATICALLY SELF-FLUSHING FILTER

[76] Inventor: C. T. Godec, P.O. Box 160, Moriarty, N. Mex. 87035

[21] Appl. No.: 557,151

[22] Filed: Jul. 19, 1990

[51] Int. Cl.$^5$ .............................................. B01D 21/30
[52] U.S. Cl. ................................ 210/136; 210/409; 210/446; 239/575
[58] Field of Search .............. 210/97, 136, 409, 435, 210/446; 239/570, 575

[56] References Cited

U.S. PATENT DOCUMENTS

| | | | |
|---|---|---|---|
| 2,770,497 | 11/1956 | Filliung et al. | |
| 2,770,498 | 11/1956 | Filliung et al. | |
| 2,936,958 | 5/1960 | Shames et al. | |
| 3,782,640 | 1/1974 | Kirschmann | 239/575 X |
| 3,951,379 | 4/1976 | Connelius | 239/570 X |
| 4,064,046 | 12/1977 | Gilger | 210/94 |
| 4,177,145 | 12/1979 | Schumacher | 210/136 |
| 4,676,438 | 6/1987 | Sesser | 239/722 |
| 4,717,073 | 1/1988 | Bielka | 239/107 |

Primary Examiner—Charles Hart

[57] ABSTRACT

An automatically self-flushing filter for use on overhead sprinkler irrigation systems, and the like, is disclosed. The filter includes a hollow cylindrical body (20), a removable screen element (30) mounted within the body (20), and a plunger (40) suspended within the body (20) by a length of elastic tubing (50). The plunger (40) is positioned for reciprocal movement through a debris outlet (28) between a retracted or debris discharging position, wherein the outlet (28) gap has a maximum width, and a filtering position, wherein the outlet (28) gap is closed. The plunger (40) is moved to its filtering position by pressurized water flowing through the body (20). Simultaneously, the water is filtered through the screen element (30) and passes out the clean water outlet (37) while debris accumulates within the body (20). When the water supply is shut off and the water pressure decreases, the plunger (40) is retracted to its debris discharging position. Accumulated debris is automatically flushed out of the body (20) through the debris outlet (28) by residual water flowing out of the system.

16 Claims, 5 Drawing Sheets

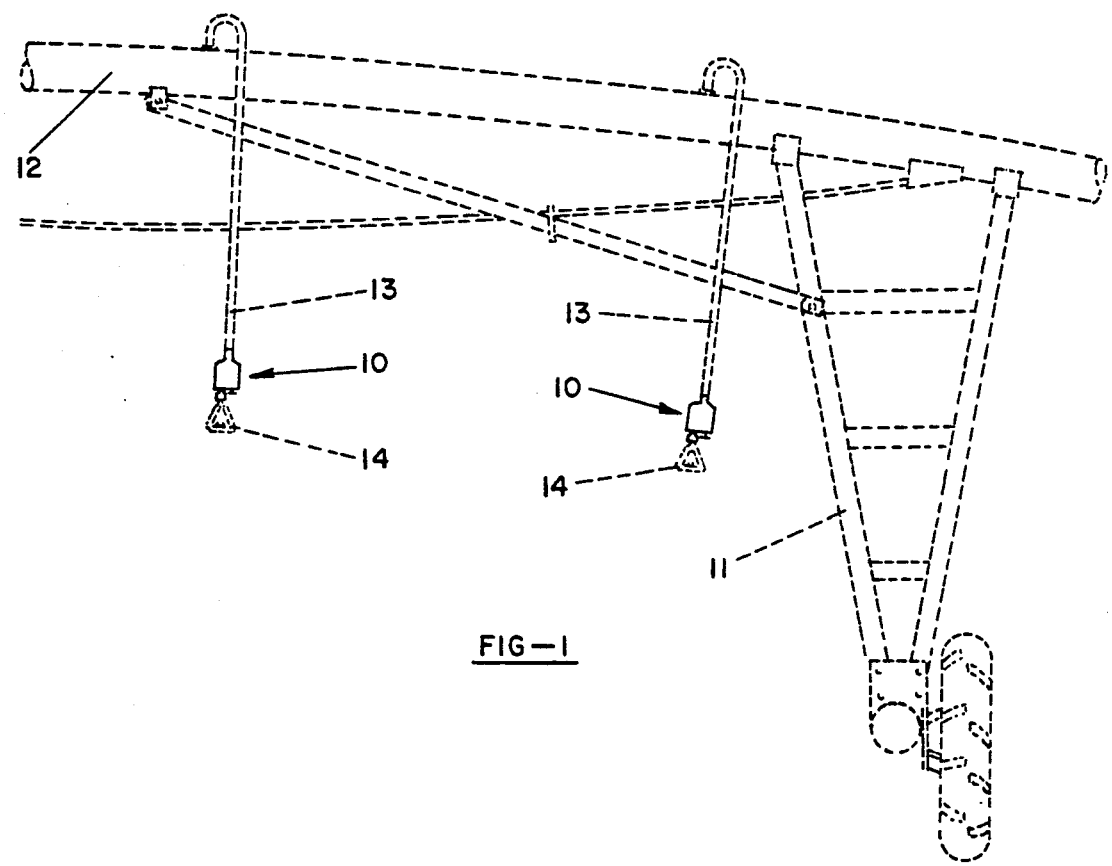
FIG—1
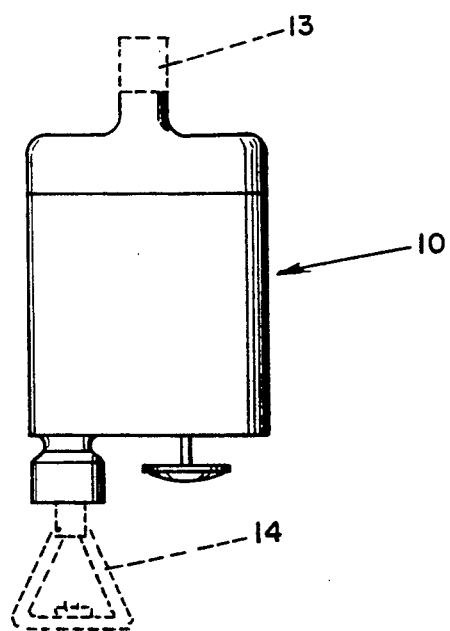
FIG—2

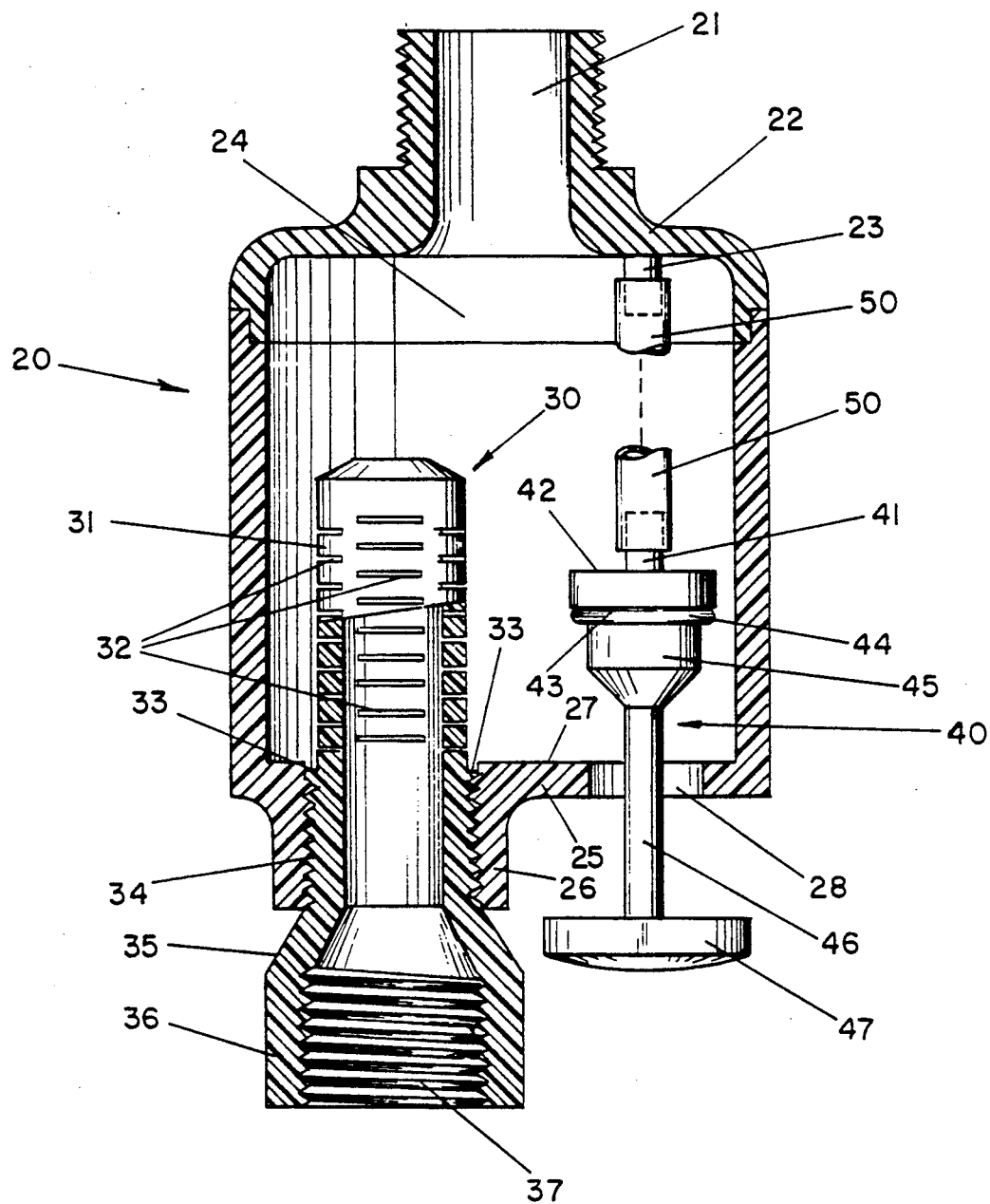
FIG—3

5,087,355

AUTOMATICALLY SELF-FLUSHING FILTER

TECHNICAL AREA

This invention relates to filters and more particularly to automatically self-flushing filters designed for, but not limited to, use on overhead sprinkler irrigation systems.

BACKGROUND OF THE INVENTION

In overhead sprinkler irrigation systems, water is pumped from wells, rivers, lakes, and other open bodies of water. Typically, the water carries dirt, rust, and other debris which clog the orifices of the spray nozzles. This clogging results in uneven water application on the field.

Heretofore, this problem has necessitated manual clearing of clogged orifices by the user. Because these systems typically have from 30 to as many as 200 spray nozzles, this manual clearing becomes a tedious and time-consuming task. The principal object of this invention, therefore, is to provide a filter which will prevent the water-borne debris from reaching the nozzle.

These overhead sprinkler irrigation systems are designed to effect a precise application of water on the field by use of nozzles which have orifices sized to a specific gallons per minute output. There are currently many sizes of nozzles manufactured. It is a further object of this invention that the filter be compatible with these existing nozzles.

Normally, these systems are in operation 24 hours a day for days at a time between shutdowns. Therefore, it is another object of this invention to provide storage space within the body of the filter for an accumulation of debris. Additionally, it is an object of this invention to provide an automatic self-flushing of the accumulated debris from the filter at shutdown and start up of the system.

A further object of this invention is to provide a debris outlet of sufficient size to allow particles of debris as large as ⅜ inch in size to pass therethrough.

Additional objects are to design a new and improved automatically self-flushing filter which is simple and durable in construction, efficient and reliable in operation, eliminates constant maintenance and servicing, and is economical in cost.

While the prior art is replete with designs for self-cleaning shower heads, self-cleaning filters, and the like, none are entirely suitable for use on overhead sprinkler irrigation systems.

The prior art devices, such as those shown in Filliung et al (U.S. Pat. No. 2,770,498, Automatic Self-Cleaning Shower Heads, 1956) and Bielka (U.S. Pat. No. 4,717,073, Sprayer Head, 1988) typically include spray diffusers as an integral part of their design. Therefore, they would not be compatible with the nozzles already in use on the systems. Additionally, there is no provision for storage of accumulated debris. Moreover, the prior art devices do not allow for passage of the larger particles of debris.

While the filtering device shown in Gilger (U.S. Pat. No. 4,064,046, Self-Cleaning Filter Apparatus, 1977) allows for connection to any nozzle and for storage of accumulated debris, the need to visually check and manually service it makes it undesirable. Further, the size and configuration of this device makes it impractical for use on an overhead sprinkler irrigation system.

SUMMARY OF THE INVENTION

In fulfillment and implementation of the previously recited objects, an automatically self-flushing filter is provided. The filter includes a hollow cylindrical body having an inlet at the upper end for connection to a drop pipe on an overhead sprinkler irrigation system. A tubular screen element is positioned within the body and removably attached at the lower end of the body. Should lime deposits accumulate over the perforations of the screen, it can be removed and cleaned. The screen element has a clean water outlet at its lower end for connection to the spray nozzle. A debris outlet is provided in the lower end of the body beside the screen element. A plunger is mounted for reciprocal movement through the debris outlet. When pressurized water is not being applied to the body, the plunger is held in a retracted position by a yieldable connecting element attached at its lower end to the top of the plunger.

When the overhead sprinkler irrigation system is started up, pressurized water flows into the body and exits through the debris outlet automatically flushing out debris that has accumulated in the body during a previous use. This flushing action continues as the water pressure builds until sufficient pressure is generated to force the plunger downward to seat against the floor of the body sealing off the debris outlet. The pressure required to seat the plunger is significantly lower than the system operating pressure.

The water is then forced through the perforations of the screen, the clean water outlet, and the spray nozzle. Unable to pass through the perforations, the water-borne debris is held within the storage space provided by the filter's hollow body. The debris continues to accumulate until the system is shutdown.

When the system is shutdown and the water pressure decreases, the plunger is retracted from the debris outlet by the yieldable connecting element. The accumulated debris is now automatically flushed from the filter through the widened gap of the outlet by the water remaining in the system.

BRIEF DESCRIPTION OF THE DRAWINGS

The foregoing and other advantages and features of the present invention will be better understood from the following description of the preferred and modified embodiments of the invention when considered in conjunction with the accompanying drawings wherein:

FIG. 1 is a side view of a filter formed in accordance with the invention shown installed on a section of an overhead sprinkler irrigation system;

FIG. 2 is an enlargement of part of FIG. 1;

FIG. 3 is a cross-sectional view of the preferred embodiment of the filter showing the plunger in its retracted or debris discharging position;

FIG. 6b is a top view taken along line 6b—6b of FIG. 6a;

List of Reference Numerals

Figure 4:
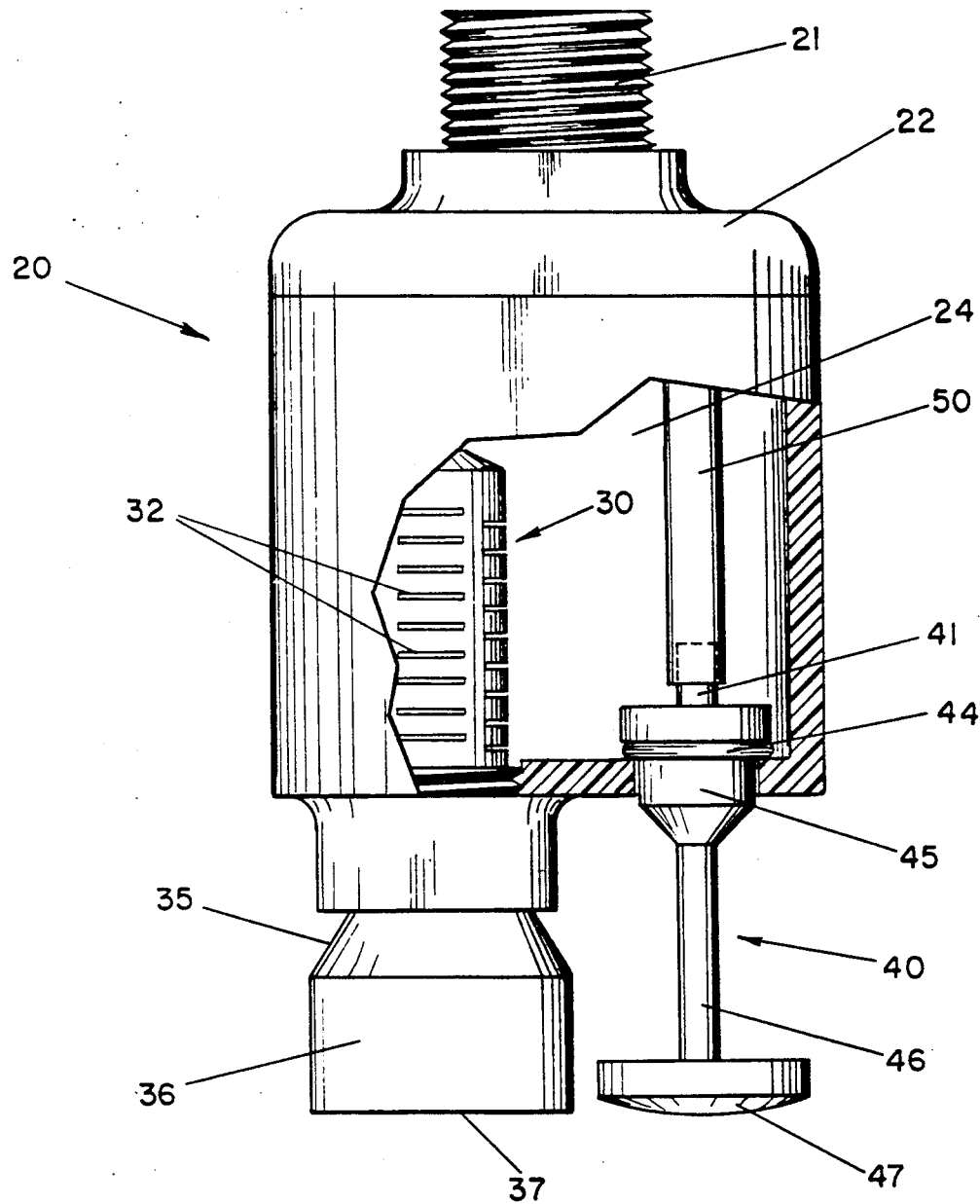
FIG. 4 is a similar sectional view showing the plunger in its filtering position.

| | |
|---|---|
| 10 | filter |
| 11 | drive unit |
| 12 | span pipe |
| 13 | drop pipe |
| 14 | spray nozzle |
| 20 | body |
| 21 | inlet |
| 22 | ceiling of 20 |
| 23 | downward protrusion |
| 24 | cavity of 20 |
| 25 | floor of 20 |
| 26 | coupling portion |
| 27 | internal shoulder |
| 28 | debris outlet |
| 30 | screen element |
| 31 | perforated section of 30 |
| 32 | perforations |
| 33 | external shoulder |
| 34 | male threads |
| 35 | threaded section of 30 |
| 36 | threaded connection |
| 37 | clean water outlet |
| 40 | plunger |
| 41 | upward protrusion |
| 42 | pressure area |
| 43 | shoulder of 45 |
| 44 | annular sealing gasket |
| 45 | head of 40 |
| 46 | stem |
| 47 | diffuser |
| 50 | elastic tubing |
| 60 | plunger (modification) |
| 61 | ring |
| 62 | cone-shaped top portion of 60 |
| 63 | openings |
| 64 | funnel-shaped portion of 60 |
| 65 | tube of 64 |
| 66 | external shoulder |
| 67 | annular sealing gasket |
| 68 | clean water outlet |
| 70 | spring |
| 71 | pin |

DETAILED DESCRIPTION OF THE ILLUSTRATED EMBODIMENTS

FIG. 1 shows a filter 10 formed in accordance with the invention in its presently contemplated environment. Specifically, the filter 10 is shown installed on a section of an overhead sprinkler irrigation system including a drive unit 11, span pipe 12, and drop pipe 13. A conventional irrigation spray nozzle 14, such as those manufactured under the name of Valley, Nelson, Rainbird, and others, is attached to the filter 10, as is more easily seen in FIG. 2.

When the irrigation system is in use, water is pumped from one end of the system to the other through the span pipe 12, and in turn, through the drop pipes 13, the filters 10, and the spray nozzles 14.

Referring now to FIG. 3, the preferred embodiment of the invention comprises a hollow cylindrically shaped body 20. At the upper end of the body, a neck portion or inlet 21 is provided having male threads thereon to facilitate connection of the body to a drop pipe 13 (as shown in FIG. 1). The lower end of the body is closed, as shown. Two symmetrically positioned axial openings, a debris outlet 28 and a coupling portion 26, are provided through the floor 25 of the body. The debris outlet 28 provides a gap for the discharge of debris from the body cavity 24, as will be hereinafter described. The coupling portion 26 extends beyond the floor 25 of the body 20 and has a diameter smaller than the diameter of the body. The coupling portion has female threads and is threadedly mated with the male threads of the screen element 30.

Figure 5:
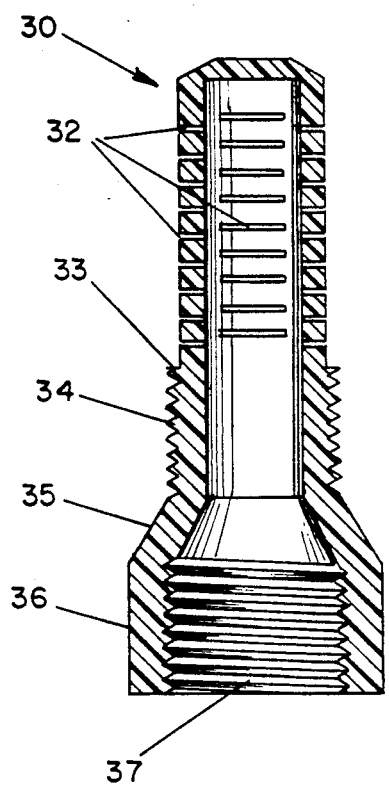
FIG. 5 is a cross-sectional view of the screen element of the invention.

A removable screen element 30, more clearly seen in FIG. 5, is threadedly attached to the body 20 at coupling portion 26 in a vertical position, as shown. Specifically, the screen element 30 is generally tubular in shape having a closed upper end and an open lower end providing a clean water outlet 37. The screen element includes an upper perforated section 31 and a lower threaded section 35. The perforated section 31 has a plurality of horizontal slit perforations 32. The size of the perforations used varies in proportion to the size of the nozzle orifices on the particular irrigation system. The outside diameter of the threaded section 35 is slightly greater than the diameter of the perforated section 31. An external shoulder 33 is formed between the two sections 31 and 35. The upper end of the threaded section 35 has male threads 34 thereon and is threadedly mated with the female threads of coupling portion 26. The lower end of the threaded section 35 is outwardly flanged and downwardly extended to provide a female threaded connection 36 for attachment to a spray nozzle 14 (as shown in FIG. 2).

Figure 6A:
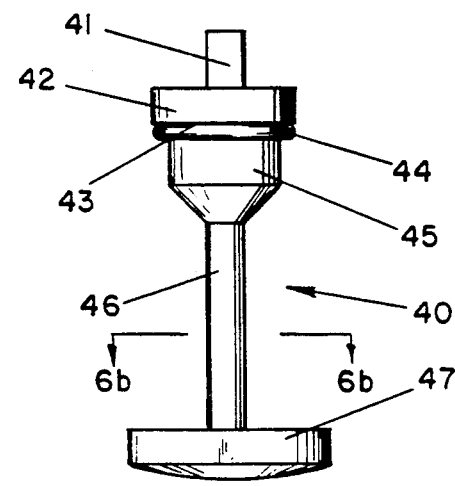
FIG. 6a is a cross-sectional view of the plunger of the invention.
Figure 6B:
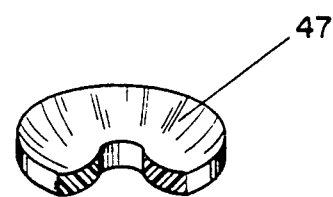

A plunger 40, more clearly seen in FIG. 6a, is positioned for reciprocal movement through debris outlet 28. Specifically, the head 45 of the plunger is cylindrical having a diameter approximately equal to the diameter of the debris outlet 28. The upper end of the head 45 is formed with a shoulder 43 which is of enlarged size relative to the head. The shoulder serves as a support for an annular sealing gasket 44 formed of rubber, or the like, which is adapted to sealingly engage the internal shoulder 27 formed by the debris outlet 28. The lower end of the head 45 tapers to a center point, as shown. An integrally formed stem 46 extends downwardly from the center point of the head and passes through the debris outlet 28. A diffuser 47, also shown in FIG. 6b, is formed at the lower end of the stem. Specifically, the diffuser is a concavo-convex ring connected perpendicularly at its center to the lower stem end. The diffuser 47 has a diameter greater than the diameter of the debris outlet 28.

The plunger 40 is held in its retracted position, as shown in FIG. 3 and described hereinafter, by a length of elastic tubing 50. The tubing is preferably made of rubber but may be any other material which is stretchable. The upper end of the tubing is mated to an integrally formed dowel-shaped protrusion 23 projecting downwardly from the ceiling 22 of the body 20 and aligned with the center of the debris outlet 28. The lower end of the tubing 50 is mated to an integrally formed dowel-shaped protrusion 41 projecting upwardly from the center of the top of the plunger head 45. The upper and lower ends of the tubing 50 are glued or otherwise appropriately secured to the protrusions 23 and 41, respectively.

While, preferably, the body 20, screen element 30, and plunger 40 are formed of a plastic material by a process such as plastic injection molding, it is to be understood that various other materials and methods could be used, if desired.

Turning now to the operation of the filter, the movable parts of the filter assume the arrangement shown in FIG. 3 when no pressurized water is supplied to the body 20. Specifically, the elastic tubing 50 is unexpanded and holds the plunger 40 in a retracted position. In this position, the head 45 of the plunger is held upwardly from the internal shoulder 27 formed by the debris outlet 28; and the diffuser 47 of the plunger hangs downwardly from the debris outlet 28. This is the debris discharging position.

Pressurized water is introduced into the body 20 through the inlet 21 and passes into the cavity 24 of the body. The water exits through the larger gap formed between the plunger stem 46 and the debris outlet 28 and strikes the diffuser 47. At this time, the exiting water flushes out any debris which may remain in the cavity 24 of the body 20 from a prior use.

As water pressure builds, the water strikes the diffuser 47 and the pressure area 42 on top of the plunger 40 with increasing velocity until the plunger is forced downwardly in opposition to the retraction force of the elastic tubing 50. The funnel-shaped design of the plunger head 45 serves to align and center the plunger in the debris outlet 28 as it continues its downward movement.

The downward movement of the plunger 40 is stopped when the annular sealing gasket 44 on the plunger seats against the internal shoulder 27 formed by the debris outlet 28. Thus, the gap at the debris outlet is closed; and the water now passes through the perforations 32 in the screen element 30 and exits through the clean water outlet 37. This is the filtering position as shown in FIG. 4. Continued water pressure within the body 20 maintains the position of the elements as described.

While in its filtering position, the pressurized water passes through the perforations 32 in the screen element 30. Simultaneously, all water-borne debris that is larger than the size of the perforations is held within the cavity 24 of the body 20 and accumulates until the water supply is turned off.

When the water supply is turned off and as the water pressure gradually decreases, the plunger 40 is retracted by the elastic tubing 50 and returns to its debris discharging position. It should be noted that the diffuser 47 prevents the entire plunger from being retracted into the body cavity 24. The water remaining in the irrigation system flows through the body 20 of the filter expelling accumulated debris from the cavity 24 through the widened gap between the plunger stem 46 and the debris outlet 28. The plunger 40 is pivotally attached to the body 20 so that the plunger stem 46 can be pushed against the edge of the debris outlet 28 by exiting water and debris. Thereby, the gap is widened further allowing larger debris to pass from the body 20.

The foregoing debris discharging action takes place automatically when the water pressure is low (i.e., when the water supply is turned on and when it is turned off) flushing out the filter thoroughly and thereby eliminating service and maintenance usually required.

Figure 7:
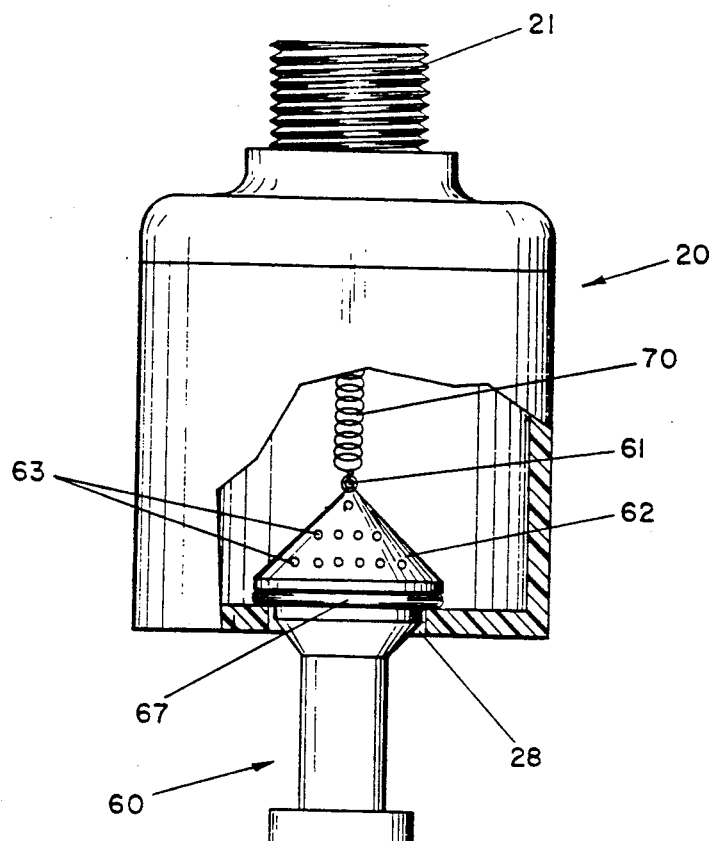
FIG. 7 is a cross-sectional view of a modification of the invention in debris discharging position.
Figure 8:
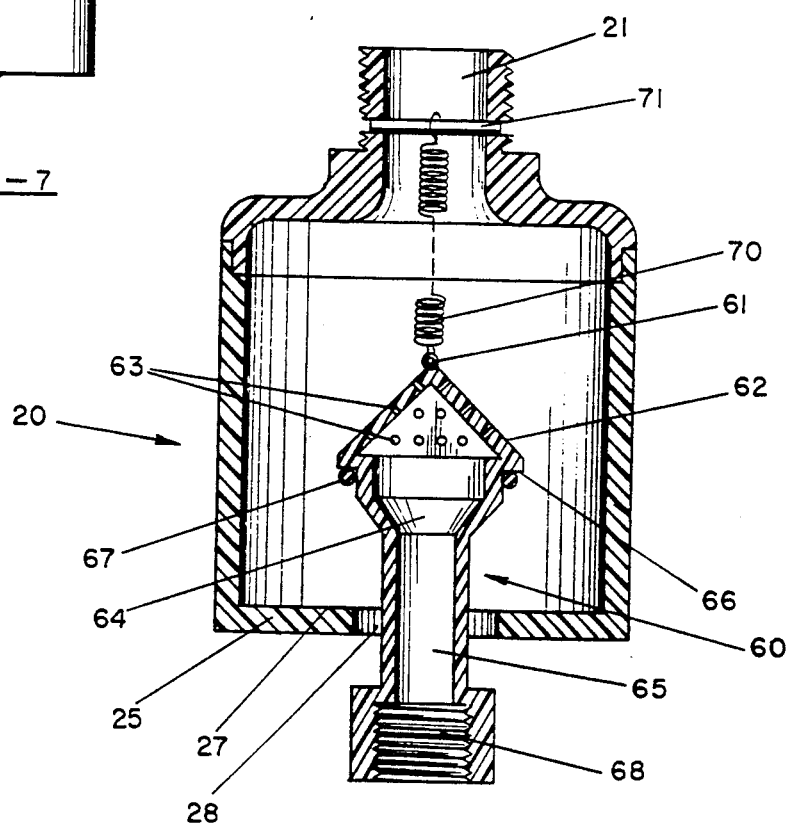
FIG. 8 is a similar sectional view of the modification in filtering position.

In the modification shown in FIGS. 7 and 8, an automatically self-flushing filter is disclosed in which a number of the elements are similar to those of the preferred embodiment shown in FIGS. 3 and 4. However, the floor 25 of the body 20 is provided with only one opening which is a debris outlet 28.

Further, the functions of the screen element 30 and the plunger 40 of the preferred embodiment are combined in the design of the plunger 60 of the modification. Specifically, the plunger 60 has a stepped bore extending therethrough. The plunger is formed with a cone-shaped top portion 62 which resides within the body 20, the diameter of the base of portion 62 being greater than the diameter of the debris outlet 28. Portion 62 is perforated with circular openings 63 for water to pass therethrough, as will be hereinafter described. A funnel-shaped portion 64 having an elongated tube 65 is formed at the base of the cone-shaped portion 62 for reciprocal movement through the debris outlet 28. The upper end of portion 64 has a fairly close sliding fit with the debris outlet. The external shoulder 66 formed between top portion 62 and portion 64 serves as a support for an annular sealing gasket 67. The gasket 67 is adapted to sealingly engage the internal shoulder 27 of the debris outlet 28. The open lower end of the plunger 60 is provided as a clean water outlet 68, which resides outside of the body 20. The outlet 68 has a diameter larger than the diameter of the tube 65 of portion 64 and is provided with female threads for connection to a spray nozzle (not shown).

The plunger 60 is held in its retracted position by a spring 70, or other suitable yieldable member, for reciprocal movement through the debris outlet 28. The upper end of the spring is wrapped around a pin 71 which passes diametrically through the body inlet 21. The lower end of the spring passes through a ring 61 formed at the point of the cone-shaped top portion 62 of the plunger 60.

Turning now to the operation of the modification, the plunger 60 is shown in its debris discharging position in FIG. 7 and in its filtering position in FIG. 8. The operation of the modification is the same as that of the preferred embodiment with the exception of the water filtering through the openings 63 in the plunger 60, passing through the plunger itself, and exiting through the clean water outlet 68 in the plunger rather than the separate screen element 30 of FIG. 4.

From the foregoing, it will be evident that the present invention provides a highly efficient and reliable yet economical automatically self-flushing filter which by its design eliminates constant servicing and maintenance.

While there has been shown and described particular embodiments of this invention, it is understood that various changes, substitutions of equivalents, and other alterations can be made without departing from the spirit and scope of the invention. Further, while the application of the invention cited herein has been to overhead sprinkler irrigation systems, it shall not be limited to such use. Therefore, the scope of the invention should be determined by the appended claims.

I claim:

1. An automatically self-flushing filter comprising:
   a. a hollow body portion, said body portion having a fluid inlet and first and second fluid outlets;
   b. fluid filter means inserted in said first fluid outlet; and
   c. apparatus, partially positioned in said second fluid outlet, for permitting fluid to pass through said second fluid outlet when the fluid pressure within said body portion is below a predetermined value and for closing said second fluid outlet in response to increasing fluid pressure within said body portion, to thereby force said fluid through said filter means.

2. The filter as set forth in claim 1, wherein said apparatus includes a plunger means and means for yieldably connecting said plunger means to said body portion, said plunger means including:
   a. means for closing said second fluid outlet; and
   b. means, responsive to increasing fluid pressure, to move said plunger against said yieldable connecting means, to move said means for closing into engagement with said second fluid outlet, to close said second fluid outlet.

3. The filter as set forth in claim 2, wherein said means to move said plunger means includes a first surface against which fluid pressure is increasingly exerted as said fluid pressure is increased.

4. The filter as set forth in claim 3, wherein said means to move said plunger means includes a second surface against which fluid pressure is increasingly exerted as said fluid pressure is increased.

5. The filter as set forth in claim 4, wherein one of said first and second surfaces is a diffuser connected to the other of said first and second surfaces of said plunger means by a stem portion, said diffuser being positioned outside said body portion.

6. The filter as set forth in claim 5, wherein said other of said first and second surfaces is positioned within said body portion and has an area that, when said fluid pressure reaches or exceeds said predetermined level, will allow said fluid pressure to hold said means for closing in engagement with said second fluid outlet, thereby forcing said fluid through said filter means.

7. The filter as set forth in claim 5, wherein said stem portion has a cross-sectional area considerably smaller than the cross-sectional area of said second fluid outlet, to facilitate the flow of fluid through said second outlet when said fluid pressure is below said predetermined value to, in turn, flush any accumulated debris from said body portion.

8. The filter as set forth in claim 7, wherein the area of said body portion adjacent said second fluid outlet is designed to collect any debris from said fluid when said second fluid outlet is closed.

9. The filter as set forth in claim 6, wherein said filter means is removable.

10. An automatically self-flushing filter comprising:
 a. a hollow body portion said body portion having a fluid inlet and a first fluid outlet; and
 b. apparatus, including a second fluid outlet and a fluid filter means positioned therein, said apparatus partially positioned in said first fluid outlet, for permitting fluid to pass through said first fluid outlet when the fluid pressure within said body portion is below a predetermined value and for closing said first fluid outlet in response to increasing fluid pressure within said body portion, to thereby force said fluid through said filter means and said second fluid outlet.

11. The filter as set forth in claim 10, wherein said apparatus includes a plunger means and means for yieldably connecting said plunger means to said body portion, said plunger means including:
 a. means for closing said first fluid outlet; and
 b. means, responsive to increasing fluid pressure, to move said plunger against said yieldable connecting means, to move said means for closing into engagement with said first fluid outlet, to close said first fluid outlet.

12. The filter as set forth in claim 11, wherein said means to move said plunger means includes first and second surfaces against which fluid pressure is increasingly exerted as said fluid pressure is increased.

13. The filter as set forth in claim 12, wherein one of said first and second surfaces is a diffuser connected to the other of said first and second surfaces of said plunger means by a stem portion, said diffuser being positioned outside said body portion.

14. The filter as set forth in claim 13, wherein said other of said first and second surfaces is positioned within said body portion and has an area that, when said fluid pressure reaches or exceeds said predetermined level, will allow said fluid pressure to hold said means for closing in engagement with said first fluid outlet, thereby forcing said fluid through said filter means.

15. The filter as set forth in claim 14, wherein said plunger means is hollow.

16. In an overhead sprinkler irrigation system including a fluid supply means and one or more sprinkler heads, means for preventing fluid-borne debris from clogging said sprinkler heads, said means including:
 a. a hollow body positionable between said fluid supply means and said sprinkler heads, said body having,
  (i) a fluid inlet couplable with said fluid supply means,
  (ii) a fluid outlet, and
  (iii) a portion for the collection of fluid-borne debris, and
 b. a filter and coupling mechanism partially positioned within said fluid outlet, said filter coupling mechanism having,
  (i) means for detachably coupling said mechanism with said fluid outlet to permit said mechanism to be removed from said hollow body,
  (ii) a filter portion positioned within said body portion and relative to said collection portion so that said fluid-borne debris can collect within said portion without blocking or plugging said filter portion, and
  (iii) means for detachably coupling with a sprinkler head.

* * * * *